(12) United States Patent
Fong et al.

(10) Patent No.: US 12,436,049 B2
(45) Date of Patent: Oct. 7, 2025

(54) SENSOR DIE WITH A DIAPHRAGM

(71) Applicant: TE Connectivity Solutions GmbH, Schaffhausen (CH)

(72) Inventors: Jeffrey C. Fong, Fremont, CA (US); Daniel T. O'Brien, Fremont, CA (US)

( * ) Notice: Subject to any disclaimer, the term of this patent is extended or adjusted under 35 U.S.C. 154(b) by 258 days.

(21) Appl. No.: 18/169,939

(22) Filed: Feb. 16, 2023

(65) Prior Publication Data
US 2024/0280425 A1    Aug. 22, 2024

(51) Int. Cl.
*G01L 9/00* (2006.01)

(52) U.S. Cl.
CPC .................. *G01L 9/0052* (2013.01)

(58) Field of Classification Search
CPC ............. G01L 9/00–08; G01L 9/0052
See application file for complete search history.

(56) References Cited

U.S. PATENT DOCUMENTS

| | | |
|---|---|---|
| 4,011,650 A | 3/1977 | Granada |
| 4,222,277 A | 9/1980 | Kurtz et al. |
| 4,322,980 A * | 4/1982 | Suzuki ............... G01L 9/0054 257/E23.009 |
| 4,790,192 A * | 12/1988 | Knecht ............... G01L 19/148 73/754 |
| 5,415,048 A | 5/1995 | Diatschenko et al. |
| 5,495,769 A | 3/1996 | Broden et al. |
| 5,837,903 A | 11/1998 | Weigand |
| 6,119,710 A | 9/2000 | Brown |
| 6,272,928 B1 | 8/2001 | Kurtz |
| 6,539,968 B1 | 4/2003 | White et al. |
| 6,543,293 B1 | 4/2003 | Kurtz et al. |
| 6,672,171 B2 | 1/2004 | Gu et al. |
| 7,013,735 B2 | 3/2006 | Miyazawa |
| 7,057,247 B2 | 6/2006 | Kurtz et al. |
| 7,082,842 B2 | 8/2006 | Kielb et al. |
| 7,197,936 B2 | 4/2007 | Baba |
| 7,275,444 B1 | 10/2007 | Kurtz et al. |
| 7,467,555 B2 | 12/2008 | Schulte et al. |
| 7,673,518 B2 | 3/2010 | Kurtz |
| 7,946,117 B2 | 5/2011 | Atkinson et al. |
| 8,024,976 B2 | 9/2011 | Kurtz et al. |
| 9,010,191 B2 | 4/2015 | Strei et al. |
| 9,234,776 B2 | 1/2016 | Strei |
| 9,316,552 B2 | 4/2016 | Wagner et al. |
| 9,562,796 B2 | 2/2017 | Lull |
| 9,638,559 B1 | 5/2017 | Zummo et al. |

(Continued)

FOREIGN PATENT DOCUMENTS

| | | |
|---|---|---|
| EP | 1369672 B1 | 2/2003 |
| GB | 2373054 B | 10/2001 |
| WO | 2011117181 A2 | 9/2011 |

OTHER PUBLICATIONS

Extended European Search Report, European Application No. 24157840.0-1001, European Filing Date: Jun. 11, 2024.

*Primary Examiner* — Nguyen Q. Ha

(57) ABSTRACT

A sensor die includes a diaphragm having a first membrane and a second membrane positioned within the first membrane. The first membrane is deflectable in proportion with a differential pressure between a first side of the diaphragm and a second side of the diaphragm opposite the first side. The second membrane is deflectable simultaneously with the first membrane and in proportion with an absolute pressure on the first side of the diaphragm.

19 Claims, 6 Drawing Sheets

(56) References Cited

U.S. PATENT DOCUMENTS

| | | |
|---|---|---|
| 10,871,407 B2 | 12/2020 | Chen et al. |
| 11,073,846 B2 | 7/2021 | Lull et al. |
| 2002/0046612 A1 | 4/2002 | Mudd |
| 2011/0259109 A1* | 10/2011 | Ahles ............... G01L 9/0045 257/419 |
| 2015/0114129 A1 | 4/2015 | Chen |
| 2019/0360894 A1* | 11/2019 | Staiger ............ G01L 9/0044 |
| 2024/0302236 A1* | 9/2024 | Wagner ............ G01L 9/0054 |

* cited by examiner

SENSOR DIE WITH A DIAPHRAGM

FIELD OF THE INVENTION

The present invention relates to a sensor die and, more particularly, to a diaphragm of a sensor die.

BACKGROUND

A pressure sensor commonly includes a sensor diaphragm and piezoresistors disposed on the sensor diaphragm. An applied force or pressure deflects the sensor diaphragm, which changes the resistance of the piezoresistors on the diaphragm, correspondingly changing a measured output of the pressure sensor that reflects the force or pressure.

Certain applications, such as a mass flow controller, require measurement of both an absolute and a differential pressure. Existing pressure sensors, however, use separate components to measure the absolute and differential pressure, respectively; for example, one sensor diaphragm with piezoresistors measures the absolute pressure and another separate sensor diaphragm with different piezoresistors measures the differential pressure. Using multiple diaphragms to measure these pressures increases the number of components required for the pressure sensor, increasing manufacturing costs. Further, using multiple diaphragms increases the size or footprint of the pressure sensor, which can restrict the use of the pressure sensor in certain applications.

SUMMARY

A sensor die includes a diaphragm having a first membrane and a second membrane positioned within the first membrane. The first membrane is deflectable in proportion with a differential pressure between a first side of the diaphragm and a second side of the diaphragm opposite the first side. The second membrane is deflectable simultaneously with the first membrane and in proportion with an absolute pressure on the first side of the diaphragm.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
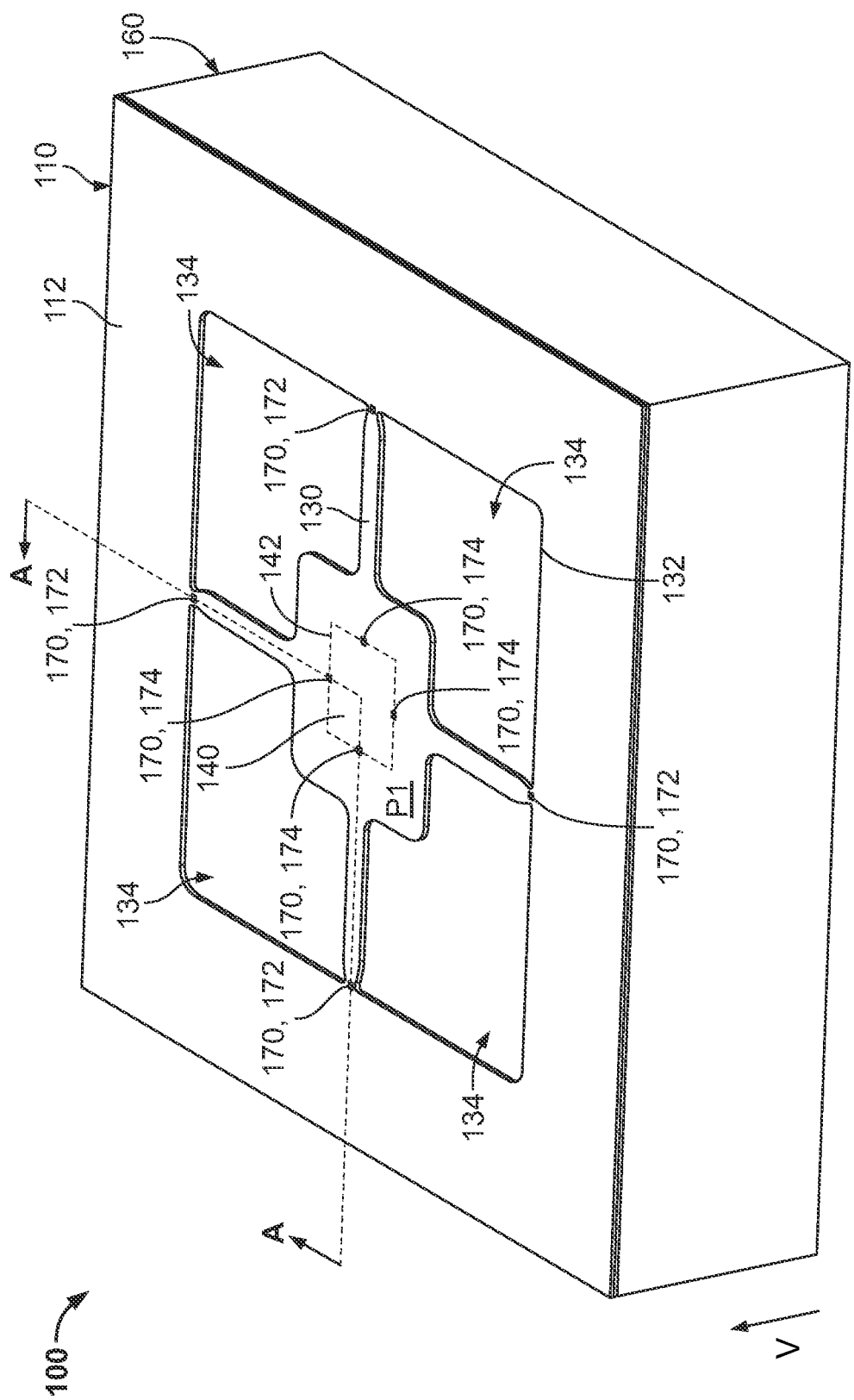
FIG. 1 is a perspective view of a sensor die according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details.

Throughout the drawings, only one of a plurality of identical elements may be labeled in a figure for clarity of the drawings, but the detailed description of the element herein applies equally to each of the identically appearing elements in the figure. Throughout the specification, directional descriptors are used such as "vertical direction". These descriptors are merely for clarity of the description and for differentiation of the various directions. These directional descriptors do not imply or require any particular orientation of the disclosed elements.

Figure 2:
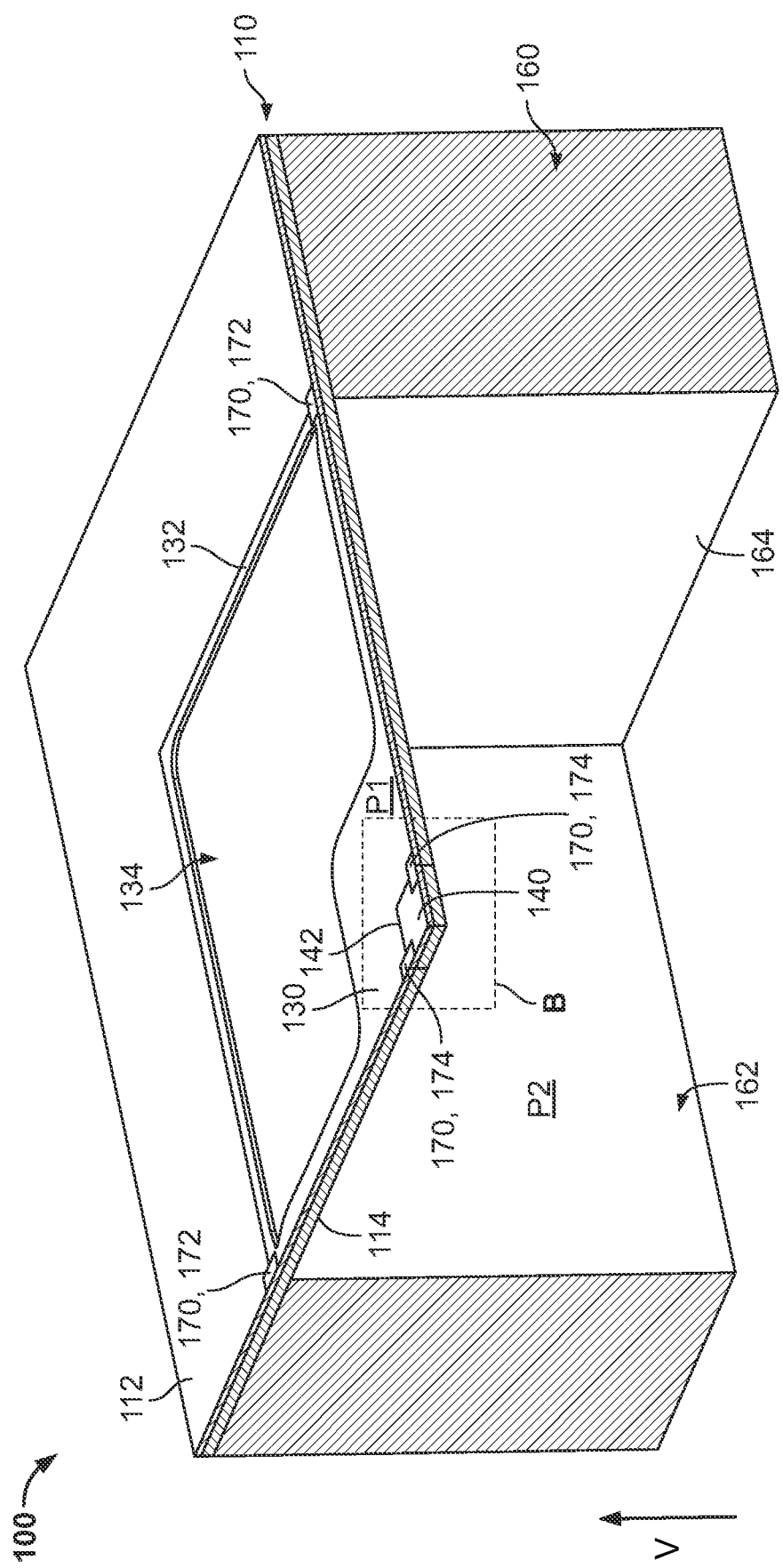
FIG. 2 is a sectional perspective view of the sensor die, taken along line A-A of FIG. 1.
Figure 3:
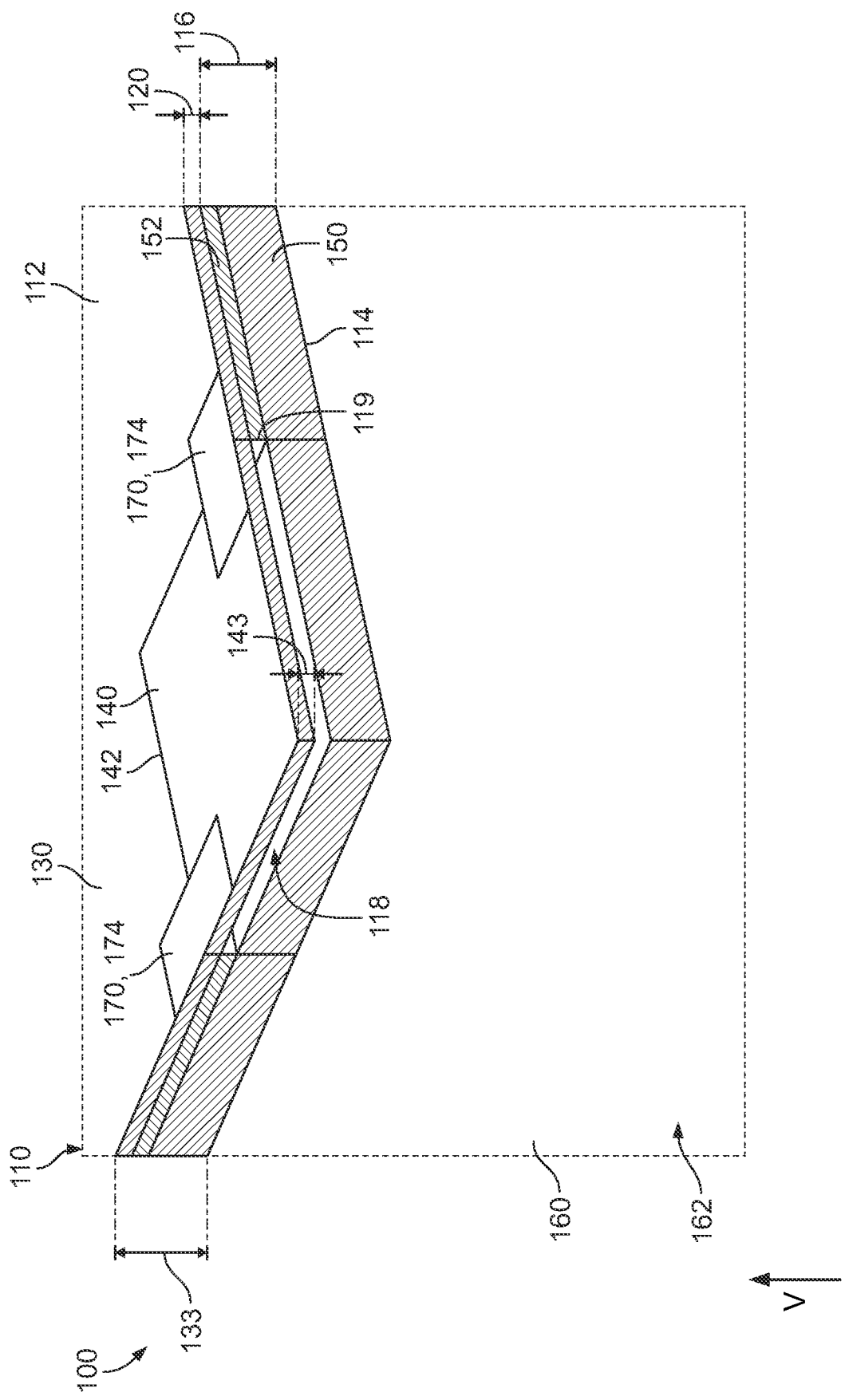
FIG. 3 is a detail perspective view of a portion B of FIG. 2.

A sensor die 100 according to an embodiment is shown in FIGS. 1-3. The sensor die 100 includes a diaphragm 110, a plurality of piezoresistive elements 170 disposed on the diaphragm 110, and a support 160 on which the diaphragm 110 is disposed.

The diaphragm 110, as shown in FIGS. 1-3, has a first side 112 and a second side 114 opposite the first side 112 in a vertical direction V. The first side 112 of the diaphragm 110 is exposed and faces outward from the sensor die 100. The second side 114 of the diaphragm 110 abuts the support 160. Between the first side 112 and the second side 114, as shown in detail in FIG. 3, the diaphragm 110 has a first layer 116 and a second layer 120 disposed on the first layer 116 in the vertical direction V.

The diaphragm 110 with the first layer 116 and the second layer 120 forms a first membrane 130 and a second membrane 140 positioned within the first membrane 130, as shown in FIGS. 1-3. The first membrane 130 has a first perimeter 132 on the diaphragm 110 defining an outer extent of the first membrane 130, while the second membrane 140 has a second perimeter 142 positioned within the first membrane 130 and defining an outer extent of the second membrane 140. The first membrane 130 surrounds the second membrane 140 and extends between the first perimeter 132 and the second perimeter 142.

The first membrane 130 is formed of the first layer 116 and the second layer 120 shown in FIG. 3. The first membrane 130 has a first thickness 133 extending between the first side 112 and the second side 114 in the vertical direction V. As shown in FIG. 3, the first layer 116 has a diaphragm cavity 118 extending into the first layer 116. The diaphragm cavity 118 has a diaphragm perimeter 119 that is aligned with the second perimeter 142 of the second membrane 140.

The second membrane 140 is formed by a portion of the second layer 120 extending over the diaphragm cavity 118, as shown in FIG. 3; the position of the diaphragm cavity 118 in the first layer 116 defines the position and extent of the second membrane 140. The second membrane 140 is formed of only the second layer 120 in the shown embodiment. The second membrane 140 has a second thickness 143 smaller than the first thickness 133 of the first membrane 130 in the vertical direction V.

In an embodiment, the diaphragm cavity 118 between the first layer 116 and the second layer 120 is a void that has a vacuum pressure. In other embodiments, the diaphragm cavity 118 may be a void having any other predetermined pressure.

In the embodiment shown in FIGS. 1 and 2, the diaphragm 110 has a recess 134 or a plurality of recesses 134 extending into the first side 112 of the diaphragm 110. The recesses 134 extend into the second layer 120 of the diaphragm 110 in the vertical direction V and decrease the first thickness 133 of the first membrane 130 at the position of the recesses 134. The recesses 134 in the shown embodiment are positioned in the first membrane 130, within the first perimeter 132, and are separated from second perimeter 142 of the second membrane 140 by a portion of the second layer 120 that does not have the recesses 134. The size and extent of the recesses 134 shown in FIGS. 1 and 2 is merely exemplary; in other embodiments, the recesses 134 may have a different area along the first side 112. In another embodiment, the first membrane 130 does not have the recesses 134 and is formed of the first layer 116 and the second layer 120 throughout the area between the first perimeter 132 and the second perimeter 142.

In the embodiment shown in FIG. 3, the first layer 116 includes a silicon portion 150 formed of a silicon material and an oxide portion 152, formed of an oxide such as silicon dioxide, disposed on the silicon portion 150. The diaphragm cavity 118 in this embodiment is created in the oxide portion 152, as described in greater detail below. In another embodiment, the first layer 116 is entirely formed of the silicon material without the oxide portion 152 and the diaphragm cavity 118 is formed in the silicon material of the first layer 116. In various embodiments, the second layer 120 is formed of the silicon material.

The support 160, as shown in FIG. 2, has a support cavity 162 positioned approximately centrally in the support 160 and extending through the support 160 in the vertical direction V. The support cavity 162 is positioned under the first membrane 130 and the second membrane 140 of the diaphragm 110 in the vertical direction V, with the second side 114 of the diaphragm 110 facing the support cavity 162. A support cavity perimeter 164 of the support cavity 162 is aligned with the first perimeter 132 of the first membrane 130 in the vertical direction V. The support 160, in an embodiment, is formed of the same silicon material as the first layer 116 and the second layer 120 of the diaphragm 110.

The piezoresistive elements 170, as shown in FIGS. 1-3, include a first set 172 of piezoresistive elements 170 disposed on the first membrane 130 and a second set 174 of piezoresistive elements 170 disposed on the second membrane 140. The piezoresistive elements 170 are an elemental material that is patterned over or embedded into the silicon material of the second layer 120 of the diaphragm 110; the piezoresistive elements 170 can be positioned on a surface of or within the second layer 120. In an embodiment, the elemental material is a positive dopant, such as p-type boron, but could be any type of material used to create a piezoresistor in a silicon material.

As shown in FIGS. 1-3, the first set 172 of piezoresistive elements 170 are positioned along the first perimeter 132 of the first membrane 130 and are aligned with the support cavity perimeter 164 of the support cavity 162 in the vertical direction V. The second set 174 of piezoresistive elements 170 are positioned along the second perimeter 142 of the second membrane 140 and are aligned with the diaphragm perimeter 119 of the diaphragm cavity 118 in the vertical direction V.

In the shown embodiment, the first set 172 of piezoresistive elements 170 includes four piezoresistive elements distributed around the first perimeter 132 and forming a first Wheatstone bridge on the first membrane 130. The second set 174 of piezoresistive elements 170 includes four piezoresistive elements distributed around the second perimeter 142 and forming a second Wheatstone bridge on the second membrane 140. In other embodiments, the first set 172 and the second set 174 of piezoresistive elements 170 can include three or less or more than four piezoresistive elements 170.

A process of manufacturing the sensor die 100 will now be described in greater detail with reference to FIGS. 4A-4C.

Figure 4A:
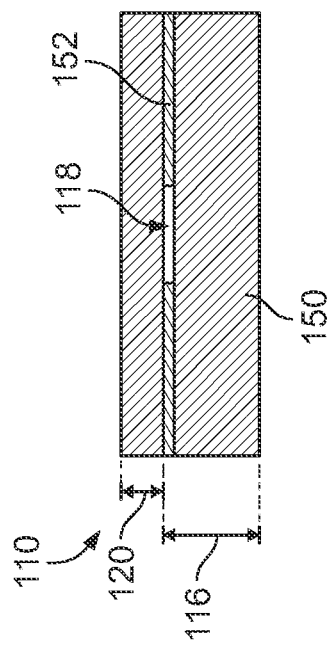
FIG. 4A is a schematic sectional diagram of a step of a process of manufacturing the sensor die.

As shown in FIG. 4A, the diaphragm 110 has the first layer 116 formed of the silicon portion 150 and the oxide portion 152 disposed on the silicon portion 150. The oxide portion 152 is etched to create the diaphragm cavity 118 in the first layer 116 and the second layer 120 is attached on the first layer 116, enclosing the diaphragm cavity 118. In another embodiment, the first layer 116 is entirely formed of the silicon portion 150, which is etched to create the diaphragm cavity 118.

Figure 4C:
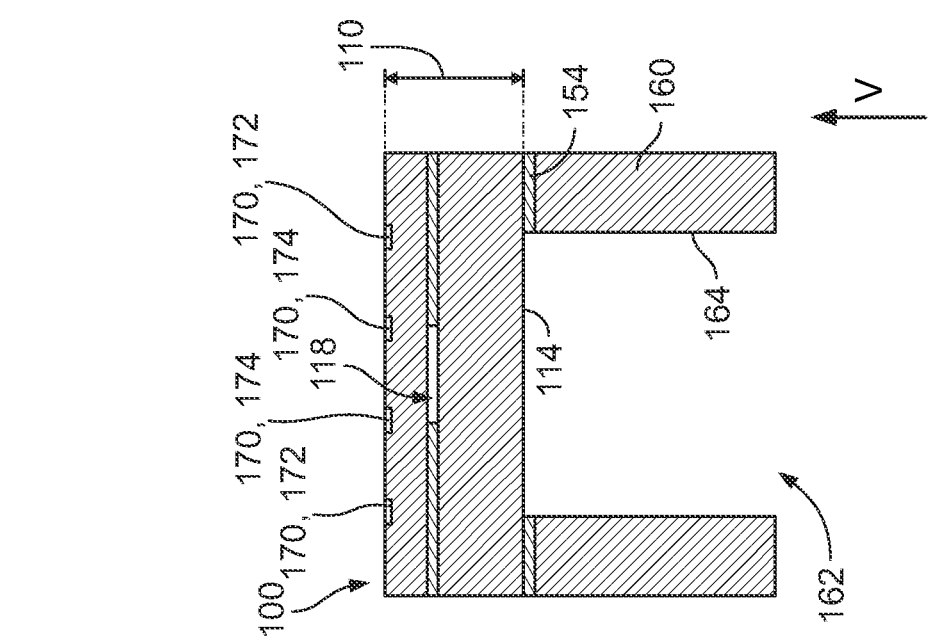
FIG. 4C is a schematic sectional diagram of another step of the process of manufacturing the sensor die.
Figure 4B:
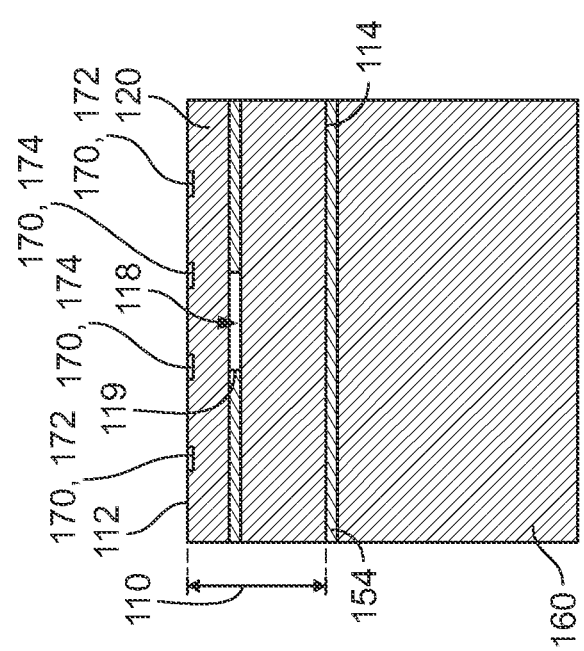
FIG. 4B is a schematic sectional diagram of another step of the process of manufacturing the sensor die.

As shown in FIG. 4B, the support 160 is bonded to the second side 114 of the diaphragm 110 by a second oxide portion 154. The piezoresistive elements 170 are implanted into the second layer 120 of the diaphragm 110; the second set 174 of piezoresistive elements 170 are aligned with the diaphragm perimeter 119 of the diaphragm cavity 118 in the vertical direction V. The piezoresistive elements 170 can be disposed on and/or within the first side 112 of the diaphragm 110.

In a step shown in FIG. 4C, the support cavity 162 is then etched into the support 160 from a backside of the support 160. The etching extends to the second side 114 of the diaphragm 110 and, in the shown embodiment, removes part of the second oxide portion 154. The etching forms the support cavity perimeter 164 of the support cavity 162 aligned with the first set 172 of the piezoresistive elements 170 in the vertical direction V.

Figure 5:
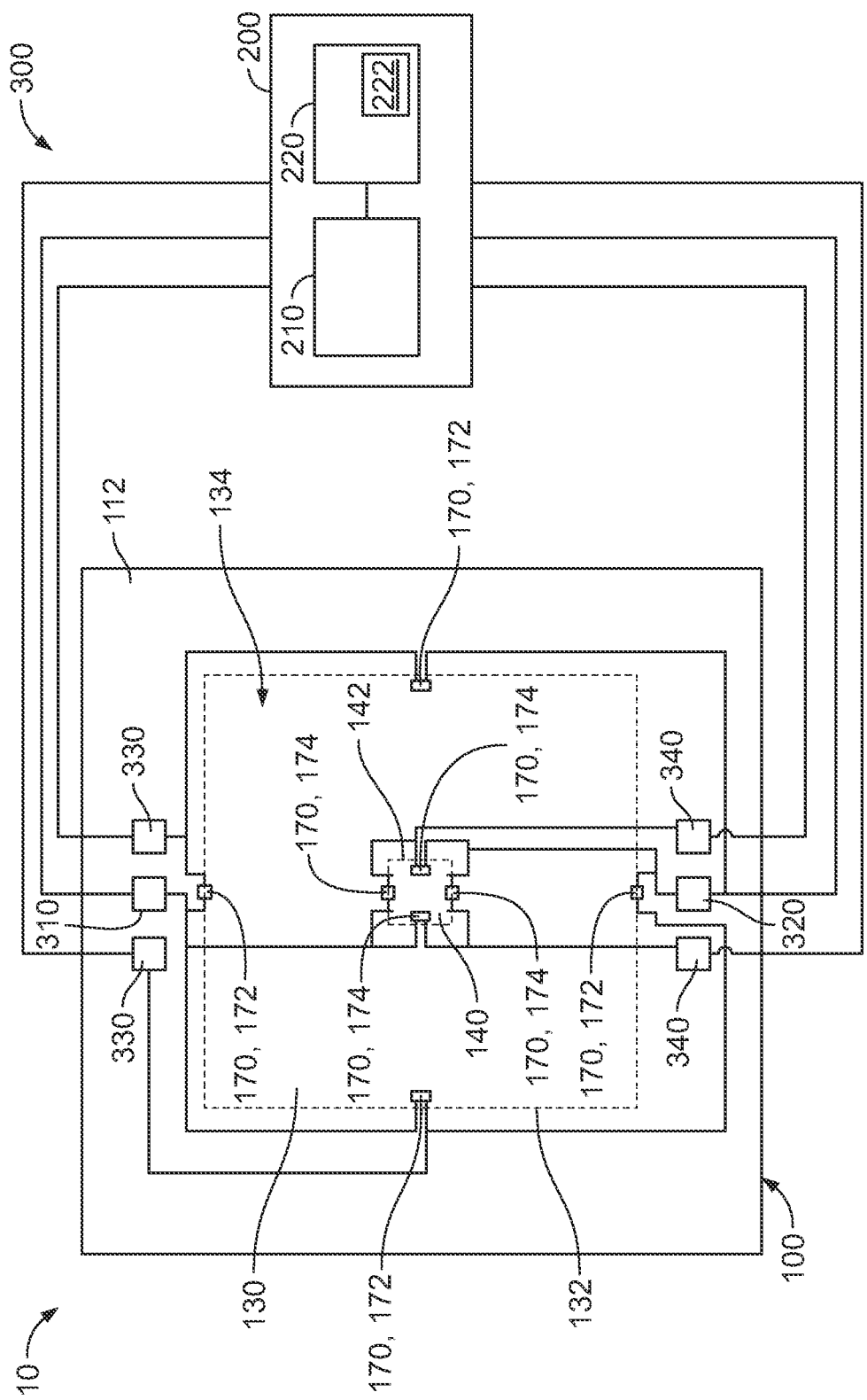
FIG. 5 is a schematic block diagram of a sensor assembly according to an embodiment.

A sensor assembly 10 according to an embodiment is shown in FIG. 5. The sensor assembly 10 includes the sensor die 100 described according to the above embodiments, a controller 200, and a plurality of connections 300 electrically connecting the piezoresistive elements 170 of the sensor die 100 to the controller 200.

The controller 200, as shown in FIG. 5, includes a processor 210 and a memory 220 connected to the processor 210. The memory 220 is formed of a non-transitory computer readable medium and has a plurality of algorithms stored thereon; these algorithms, when executed by the processor 210, perform the functions of the controller 200 described in detail herein. One of the algorithms stored on the memory 220 is a compensation algorithm 222, which will be described in greater detail below with reference to FIG. 6.

The connections 300 in the embodiment shown in FIG. 5 are each electrical lines or electrically conductive elements capable of transmitting an electrical signal. As shown in FIG. 5, the connections 300 include a supply 310, a ground 320, a first pair of outputs 330, and a second pair of outputs 340. The supply 310 is a single connection shared among the first set 172 and the second set 174 of the piezoresistive elements 170 that supplies a voltage to the piezoresistive elements 170. The ground 320, in the shown embodiment, is also a single connection shared among the first set 172 and the second set 174 of the piezoresistive elements 170. The first outputs 330 connect the first set 172 of piezoresistive elements 170 to the controller 200 and the second outputs 340 connect the second set 174 of piezoresistive elements 170 to the controller 200.

The function of the sensor assembly 10 and the sensor die 100 will now be described in greater detail, primarily with reference to FIGS. 1 and 5.

The sensor die 100 is used to measure pressure, from a physical element or from a fluid, in the environment in which it is placed. A first pressure P1, shown in FIGS. 1 and 2, acts on the first side 112 of the diaphragm 110. The location of the first pressure P1 shown in FIGS. 1 and 2 is merely exemplary; the first pressure P1 acts across both the first membrane 130 and the second membrane 140 in the vertical direction V. The first membrane 130 and the second membrane 140 formed by the layers 116, 120 of the diaphragm 110 are deflectable and deflect in proportion with a magnitude of the first pressure P1 toward the support cavity 162 in the vertical direction V.

As shown in FIG. 2, the support cavity 162 has a second pressure P2 acting on the second side 114 of the diaphragm 110. The location of the second pressure P2 in FIG. 2 is merely exemplary; the second pressure P2 acts across the second side 114 of the diaphragm 110 in the vertical direction V opposite to the first pressure P1. As the second pressure P2 on the second side 114 of the first membrane 130 acts counter to the first pressure P1 on the first side 112 of the first membrane 130, the first membrane 130 is deflectable in proportion with a differential pressure between the first pressure P1 on the first side 112 and the second pressure P2 on the second side 114.

A resistance of the first set 172 of piezoresistive elements 170 changes in proportion with the deflection of the first membrane 130. As the resistance of the first set 172 changes, a first signal output along the first pair of outputs 330 to the controller 200 shown in FIG. 5 also changes; the first signal transmitted to the controller 200 through the first set 172 of piezoresistive elements 170 represents the deflection of the first membrane 130 and the differential pressure between the first pressure P1 and the second pressure P2.

The second membrane 140 is deflectable simultaneously with the first membrane 130 under the first pressure P1. As the diaphragm cavity 118 has a vacuum pressure or a known pressure, the vacuum or known pressure acts counter to the first pressure P1 on the second membrane 140. The second membrane 140 is thereby deflectable into the diaphragm cavity 118 in proportion with an absolute measure of the first pressure P1 on the first side 112 of the diaphragm 110. The second membrane 140 positioned within the first membrane 130 deflects simultaneously with the first membrane 130 but in proportion to a different measure of pressure than the first membrane 130.

A resistance of the second set 174 of piezoresistive elements 170 changes in proportion with the deflection of the second membrane 140. As the resistance of the second set 174 changes, a second signal output along the second pair of outputs 340 to the controller 200 shown in FIG. 5 also changes; the second signal transmitted to the controller 200 through the second set 174 of piezoresistive elements 170 represents the deflection of the second membrane 140 and the absolute measure of the first pressure P1.

In the embodiment of the first membrane 130 having the recesses 134 shown in FIGS. 1 and 2, the recesses 134 increase the sensitivity of the deflection of the first membrane 130 to the differential pressure without affecting the sensitivity of the deflection of the second membrane 140 to the absolute pressure.

In some applications, the stress and deflection caused by the differential pressure on the first membrane 130 may affect the simultaneous deflection of the second membrane 140 and the measurement of the absolute pressure from the second set 174 of piezoresistive elements 170. In an embodiment, the controller 200 can also process the differential and absolute pressure measurements received through the piezoresistive elements 170 to compensate for the deflection of the first membrane 130 that transmits stress to the second set 174 of piezoresistive elements 170.

Figure 6:
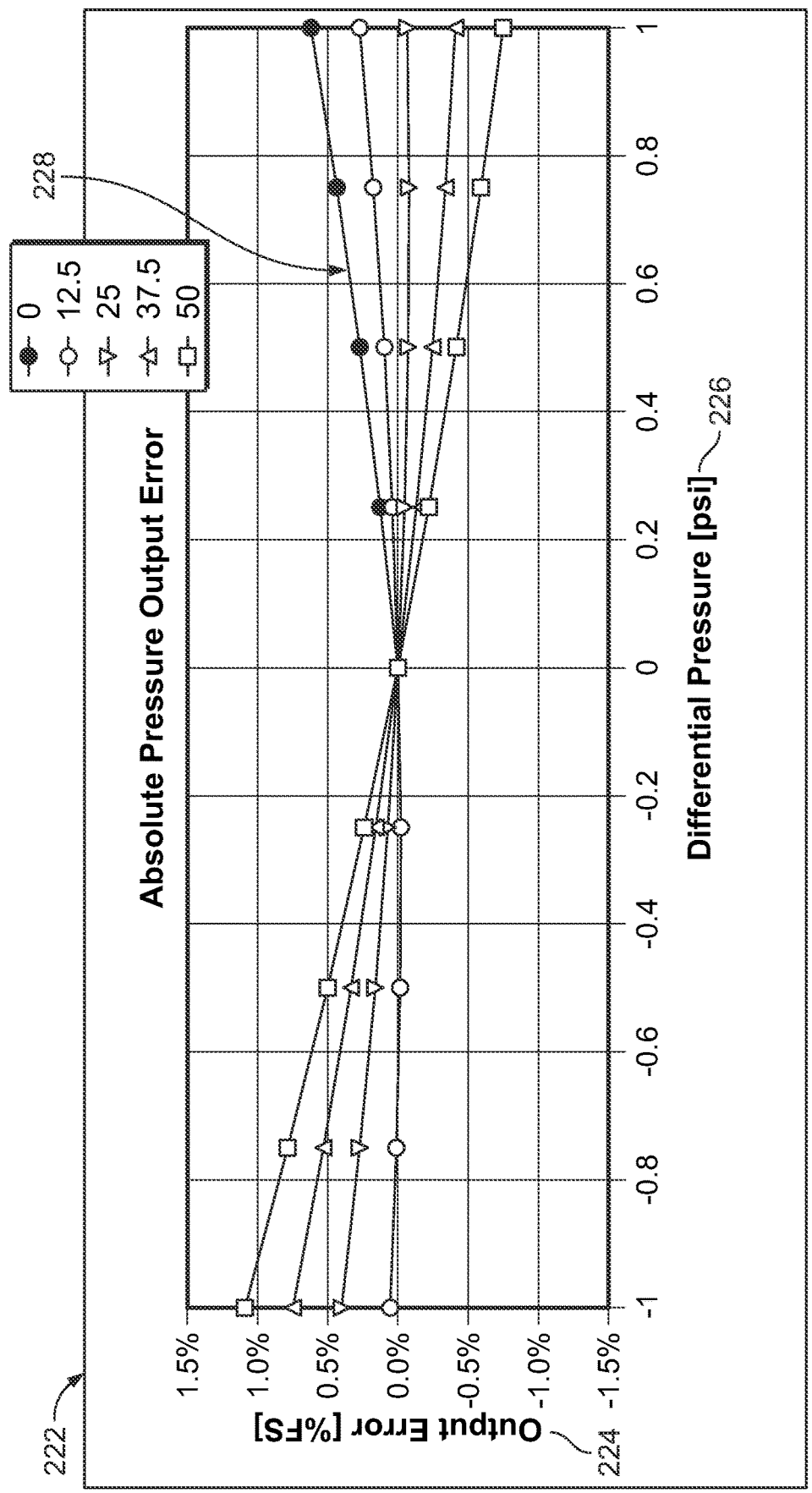
FIG. 6 is a graph depicting a relationship of a compensation algorithm according to an embodiment.

FIG. 6 is a graphical representation of the compensation algorithm 222 stored on the memory 220 and executable by the processor 210. The compensation algorithm 222 stores a plurality of output errors 224 in relation to a measured differential pressure 226 from the first set 172 of piezoresistive elements 170 and a measured absolute pressure 228 from the second set 174 of piezoresistive elements 170. For a given differential pressure 226 and a given absolute pressure 228, the output error 224 to be applied to the measured absolute pressure 228 to correct the absolute pressure 228 can be determined from the relationship in the compensation algorithm 222. For example, a measured differential pressure 226 of 0.6 psi and a measured absolute pressure 228 of 50 psi gives an output error 224 of −0.5%.

The relationship between the measured differential pressures 226, the measured absolute pressures 228, and the output errors 224 is determined by calibration in controlled conditions, applying 0 psi and 50 psi for the absolute pressure in various combinations with applied 0, −1, and 1 psi for the differential pressure and measuring the outputs. A base error is determined in the absolute pressure with the differential pressure set to 0 psi. A slope is then determined for the error over differential pressures while holding the absolute pressure at 0 and 50 psi. This base and slope can then be used to determine the output errors 224 at a range of measured differential pressures 226 and measured absolute pressures 228.

The processor 210 of the controller 200 can then execute the compensation algorithm 222 to calculate an actual absolute pressure based on the measured absolute pressure 228 multiplied by the output error 224. In the example used above, the actual absolute pressure would be 50.25 psi, which is 0.25 psi, or 0.5%, more than the measured absolute pressure 228 of 50 psi; the negative output error in the graph of FIG. 6 indicates that the measured absolute pressure 228 is low and needs to be compensated higher. The actual absolute pressure corrects for the error in the measured absolute pressure 228 caused by the deflection of the first membrane 130.

The controller 200 receiving the differential pressure P1-P2 measurement and the absolute pressure P1 measurement from piezoresistive elements 170 of the sensor die 100 can transmit the measurements, compensated or uncompensated, externally for further use and processing.

The sensor die 100, and the sensor assembly 10 including the sensor die 100, according to the invention has the first membrane 130 measuring the differential pressure and the second membrane 140 simultaneously measuring the absolute pressure formed within the same diaphragm 110. Incorporating both a differential pressure measurement and an absolute pressure measurement within membranes 130, 140 of the same diaphragm 110 decreases the component count and overall size of the sensor die 100, allowing for lower manufacturing costs and improved flexibility in small applications. Further, compensating for potential errors in the absolute measurement caused by deflection of the first membrane 130 maintains a high accuracy of both the absolute and differential pressure measurements made with the sensor die 100.

What is claimed is:

1. A sensor die, comprising:
a diaphragm having a first membrane and a second membrane positioned within the first membrane, the first membrane is deflectable in proportion with a differential pressure between a first side of the diaphragm and a second side of the diaphragm opposite the first side, the second membrane is deflectable simultaneously with the first membrane and in proportion with an absolute pressure on the first side of the diaphragm, the diaphragm includes a first layer and a second layer disposed on the first layer, the first membrane is formed of the first layer and the second layer, and the second membrane is formed of the second layer, the first layer has a diaphragm cavity extending into the first layer, the first layer includes a silicon and an oxide disposed on the silicon, the diaphragm cavity is formed in the oxide of the first layer.

2. The sensor die of claim 1, wherein the second membrane is formed by a portion of the second layer extending over the diaphragm cavity.

3. The sensor die of claim 2, wherein the diaphragm cavity between the first layer and the second layer has a vacuum pressure.

4. The sensor die of claim 1, wherein the first membrane has a recess extending into the first side of the diaphragm, the recess is separated from the second membrane.

5. The sensor die of claim 1, further comprising a support on which the diaphragm is disposed, the support has a support cavity, the second side of the diaphragm faces the support cavity.

6. The sensor die of claim 5, wherein the differential pressure is measured between a first pressure on the first side of the diaphragm and a second pressure in the support cavity on the second side of the diaphragm.

7. The sensor die of claim 1, further comprising a plurality of piezoresistive elements including a first set forming a first Wheatstone bridge positioned on the first membrane, and a second set forming a second Wheatstone bridge positioned on the second membrane.

8. The sensor die of claim 5, wherein a first set of piezoresistive elements disposed on the first membrane are aligned with a support cavity perimeter of the support cavity.

9. The sensor die of claim 2, wherein a second set of piezoresistive elements disposed on the second membrane are aligned with a diaphragm perimeter of the diaphragm cavity.

10. A process of manufacturing a sensor die, comprising:
providing a first layer of a diaphragm;
etching a diaphragm cavity into the first layer; and
attaching a second layer of the diaphragm on the first layer, a portion of the first layer and the second layer outside of the diaphragm cavity forms a first membrane and a portion of the second layer extending over the diaphragm cavity forms a second membrane positioned within the first membrane, the first membrane is deflectable in proportion with a differential pressure between a first side of the diaphragm and a second side of the diaphragm opposite the first side, the second membrane is deflectable simultaneously with the first membrane and in proportion with an absolute pressure on the first side of the diaphragm.

11. The process of claim 10, wherein the first layer includes a silicon and an oxide disposed on the silicon, the diaphragm cavity is formed in the oxide of the first layer.

12. The process of claim 11, further comprising bonding a support to the second side of the diaphragm and etching a support cavity into the support, the second side of the diaphragm faces the support cavity.

13. The process of claim 12, further comprising implanting a plurality of piezoresistive elements in the second layer.

14. The process of claim 13, wherein a first set of the piezoresistive elements is disposed on the first membrane and aligned with a perimeter of the support cavity, and a second set of the piezoresistive elements is disposed on the second membrane and aligned with a perimeter of the diaphragm cavity.

15. A sensor assembly, comprising:
a sensor die including a diaphragm having a first membrane and a second membrane positioned within the first membrane, the first membrane is deflectable in proportion with a differential pressure between a first side of the diaphragm and a second side of the diaphragm opposite the first side, the second membrane is deflectable simultaneously with the first membrane and in proportion with an absolute pressure on the first side of the diaphragm; and
a controller connected to the sensor die and receiving the differential pressure and the absolute pressure from the sensor die, the controller executes a compensation algorithm based on the differential pressure to correct an error in the absolute pressure.

16. The sensor assembly of claim 15, wherein the sensor die includes a plurality of piezoresistive elements including a first set forming a first Wheatstone bridge positioned on the first membrane, and a second set forming a second Wheatstone bridge positioned on the second membrane.

17. The sensor assembly of claim 16, further comprising a plurality of connections connected to the piezoresistive elements, the first set and the second set of the piezoresistive elements share at least one of a supply and a ground of the connections.

18. The sensor assembly of claim 17, wherein the controller is connected to the first set of the piezoresistive elements by a plurality of first outputs and connected to the second set of the piezoresistive elements by a plurality of second outputs, the controller receives the differential pressure measured by the first set of the piezoresistive elements and the absolute pressure measured by the second set of the piezoresistive elements.

19. A sensor die, comprising:
a diaphragm having a first membrane and a second membrane positioned within the first membrane, the first membrane is deflectable in proportion with a differential pressure between a first side of the diaphragm and a second side of the diaphragm opposite the first side, the second membrane is deflectable simultaneously with the first membrane and in proportion with an absolute pressure on the first side of the diaphragm, the first membrane has a recess extending into the first side of the diaphragm, the recess is separated from the second membrane.

* * * * *